United States Patent Office 3,808,169
Patented Apr. 30, 1974

3,808,169
PROCESS FOR THE PREPARATION OF
POLYMER SOLUTIONS
Desmond Wilfrid John Osmond, 22 Clewer Park Windsor, Berkshire, Iver Heath, England, and Morice William Thompson, Urishay, Highfield Lane, Cox Green, Maidenhead, Berkshire, England
No Drawing. Continuation of application Ser. No. 436,305, Mar. 1, 1965. This application Mar. 10, 1972, Ser. No. 233,731
Claims priority, application Great Britain, Mar. 13, 1964, 10,728/64
Int. Cl. C08f 45/26, 47/20
U.S. Cl. 260—34.2                    8 Claims

ABSTRACT OF THE DISCLOSURE

A process for making solutions in organic solvent of acrylic polymers by dispersion polymerizing monomer in an organic liquid in which it is soluble, but in which the resulting polymer is insoluble and forms disperse polymer particles, the reaction being carried out in the presence of a stabilizer having a constituent which becomes associated with the disperse polymer particles and a pendent chain-like constituent which is solvated by the organic liquid and provides a stabilizing sheath around the polymer particles, the disperse polymer particles then being separated from the major part of the organic liquid of the dispersion and dissolved in organic solvent. Preferably, the polymer is transferred directly into solution by making the dispersion in a relatively low boiling non-solvent liquid and then adding a higher boiling solvent to the dispersion and evaporating the lower boiling liquid. Preferably, the disperse polymer particles produced by the polymerization have a particle size larger than is the case where the dispersions are used as such in coating compositions; a particle size ranging from 0.5 to 5.0 microns is suitable.

---

This is a continuation of prior U.S. application Ser. No. 436,305, filed Mar. 1, 1965, and now abandoned.

This invention relates to processes of making solutions of acrylic polymers particularly suitable for use in coating compositions and to polymer solutions thereby produced.

It is well known that when used as film-forming materials in coating compositions acrylic polymers should be of high molecular weight because of the improvement in toughness and resistance of the film formed from such polymers. It is also well known that as the molecular weight is increased, so is the viscosity of a solution of the polymer; but since there is a practical limit to the viscosity of solutions used in coating compositions, either more powerful and usually more expensive solvents must be used for higher molecular weight polymers or a reduction in solids content of the solution must be accepted.

Much of the difficulty in dealing with solutions of acrylic polymers of molecular weight over 50,000 is due to the fact that the polymers made by normal solution or aqueous pearl polymerization processes are of a widespread range of molecular weights and usually contain a small proportion of molecular weight 500,000 or more. Although the molecular weight of a polymer may be expressed as, say, 100,000, this is an average figure and the polymer is, in fact, a mixture of polymers of molecular weights which may range from 30,000 to 300,000. This widespread range of molecular weights gives rise to two disadvantages. Firstly, the lower molecular weight polymer content had an adverse effect on such film properties as toughness and resistance. Secondly, the higher molecular weight polymer content exerts an adverse effect on the application properties of the solution which is out of proportion to any beneficial influence it might have on film properties.

We have found that acrylic polymers made by dispersion polymerization processes have much better characteristics when applied from solution than similar polymers of the same average molecular weight produced by solution or aqueous pearl polymerization.

By "dispersion polymerization" we mean a process of polymerizing acrylic monomer in an organic liquid in which the monomer is soluble and the resulting polymer is insoluble and forms disperse particles, the liquid containing a stabilizer for the disperse particles of polymer produced by the polymerization which provides a stabilizing sheath around the polymer particles.

Such dispersion-polymerized polymers are advantageously used in solution coating compositions.

The present invention provides, therefore, a process for making solutions in organic solvent of acrylic polymers by dispersion polymerizing monomer in an organic liquid in which it is soluble, but in which the resulting polymer is insoluble and forms disperse polymer particles, the reaction being carried out in the presence of a stabilizer having a constituent which becomes associated with this disperse polymer particles and a pendent chain-like constituent which is solvated by the organic liquid and provides a stabilizing sheath around the polymer particles, the disperse polymer particles then being separated from the major part of the organic liquid of the dispersion and dissolved in organic solvent.

By "acrylic polymer" is meant a polymer of an ester or amide of acrylic or methacrylic acid or a copolymer of such an ester with another copolymerizable monomer. Suitable esters include those of alcohols containing 1–8 carbon atoms, such as methyl, ethyl, butyl and 2-ethoxy ethyl methacrylate and ethyl acrylate. Suitable amides include acrylamide, methacrylamide, tetriary butyl acrylamide and primary alkyl acrylamides. Mixtures of such esters or amides may be copolymerized or one or more of the esters may be copolymerized with a higher alkyl ester or amide or acrylic or methacrylic acid or with another monomer containing a copolymerizable vinyl group, e.g. itaconate esters, maleates and allyl compounds.

Not all the organic liquid of the dispersion need be separated but it is preferred to remove as much as possible since the lower the residual content of the non-solvent from the dispersion less solvent or less powerful solvent is needed to dissolve the polymer. The disperse particles of polymer may be separated from the organic liquid of the dispersion by coagulation, centrifugation, filtration, spray-drying, fluidized-bed drying, or other means, before being dissolved in organic solvent.

Preferably, however, the polymer is transferred directly into solution by making the dispersion in a relatively low boiling non-solvent liquid and then adding a higher boiling solvent to the dispersion and evaporating the lower boiling liquid. The addition of solvent and evaporation of non-solvent may take place consecutively or concurrently. A particularly advantageous embodiment of this direct transfer method is one in which the dispersion is heated to about its refluxing temperature, the solvent is heated to at least as high a temperature and is added to the dispersion and non-solvent is then separated by distillation. Boiling points of the liquids may range from −40° C. to 150° C. but preferably liquid used in the dispersion boils in the range 60–90° C. in which case the solvent used to dissolve the polymer by the direct transfer method has a boiling point above 100° C.

The organic liquid of the dispersion is a non-solvent for the polymer; aliphatic hydrocarbons, optionally with a minor proportion of aromatic hydrocarbon, are very suitable. The most suitable solvents will vary according to the precise nature of the polymer to be dissolved but in many cases this invention makes possible the use of large proportions of the cheaper solvents such as toluene and acetone. Even when using solvents of this type it is possible, according to this invention, to formulate coating compositions which at spraying viscosity contain from 20%–30% by weight of polymer. Similar coating compositions based on polymer made by conventional solution processes contain only 12–14% polymer at this viscosity.

Preferably, the disperse polymer particles produced by the polymerization have a particle size larger than is the case where the dispersions are used as such in coating compositions; a particle size ranging from 0.5 to 5.0 microns is suitable. This facilitates transfer of the particles into solution, particularly where direct transfer is involved, since the rate of swelling of the particles by the solvent during the transition from dispersion to solution is more controllable. When the polymer is separated from the organic liquid of the dispersion before being dissolved, the larger size particles are also more easy to separate and dry.

Particle sizes in the preferred range may be achieved using stabilizer or stabilizer precursor as hereinafter explained in a proportion of from 0.1 to 1% by weight of the disperse polymer.

Dispersion of the larger size polymer particles may be made by one embodiment of the process of this invention in which, during the continuous addition of the monomer, stabilizing block or graft copolymer or a precursor thereof is also added with the monomer, this concurrent addition being discontinued before addition of the monomer is completed. Conveniently the concurrent addition of stabilizer or precursor is discontinued after addition of from 40% to 70% of the monomer.

In a further embodiment the organic liquid in which the polymerization is carried out contains a minor proportion of a solvent for the polymer though, of course, the mixture as a whole must be a non-solvent for the polymer, by which we mean that at least 95% of the polymer is insoluble therein. The solvent may be of the type used to form the final solution of polymer. This minor proportion of solvent which, according to the nature of the solvent may be up to 40% by weight of the liquid, assists in coarsening the particle size of the dispersion, and in the case where copolymers are being formed and dispersed, it may assist in dissolving one or more of the co-monomers and improve the stability of the dispersed particles of copolymer.

The major proportion of the monomer, which includes mixtures of monomers where co-monomers are used, is preferably added during the course of the reaction, this major proportion usualy being not less than 80%. Further, the rate of addition, which preferably is continuous, is such that the proportion of free monomer dissolved in the reaction liquid during the addition is not more than 50% by weight of the reaction liquid.

Where the polymers are to be used in coating compositions, the molecular weight is less than 250,000 and so preferably a chain transfer agent is used in the polymerization reaction, this agent being of a polarity similar to that of the monomer so that it is distributed between the organic liquid and polymer particles in a proportion similar to that of the monomer. Further, it shoud have a chain transfer co-efficient of approximately unity in relation to the monomer. For example, in polymerizations of acrylic monomer carried out in non-polar liquids such as aliphatic hydrocarbons, alkyl mercaptans wherein the alkyl group contains from 4–10 carbon atoms are preferred.

If the polymer is appreciably soluble in the monomer the reaction should be carried out under reflux conditions, the monomer and corresponding quantities of stabilizer, initiator and chain transfer agent being added to the returning reflux stream.

The initiator used will depend on the nature of the polymerization process. For example, as stated above, the polymer particles are stabilized as they are formed and in one embodiment of the invention this stabilizer is a block or graft copolymer having one polymeric constituent which is solvated by the organic liquid and another polymeric constituent of different polarity which associates with the disperse polymer. This copolymer may be formed simultaneously with the disperse polymer by having present in solution in the reaction liquid a polymer (termed "precursor") which can be copolymerized with a minor part of the monomer to form the necessary block or graft copolymer. Typical examples of these soluble, and therefore solvated, polymeric precursors which form the solvated polymeric constituent of the stabilizing block or graft copolymer are:

polymers of long chain esters of acrylic or methacrylic acid, e.g. stearyl, lauryl, octyl, 2-ethyl hexyl and hexyl esters of acrylic or methacrylic acid; polymeric vinyl esters of long chain acids, e.g. vinyl stearate;
polymeric vinyl alkyl ethers; polymers of ethylene, propylene, butadiene and isoprene; and long chain fatty acids and polymers of hydroxy fatty acids.

It is preferred that the copolymerization takes place through an unsaturated group present in the precursor which group copolymerizes in vinyl-type manner with the main monomer. Such precursors may be made, for example, as described in our U.S. Pat. No. 3,317,635, by reacting a compound containing both a C=C group and a reactive group with an addition polymer containing complementary groups which will react by a condensation reaction with the compound. The resulting linkage may be an ester, ether, amide or urethane link. For example, an addition polymer containing carboxyl groups may be reacted with C=C unsaturated compound containing glycidyl groups to form an ester link between the polymer and the compound containing the C=C group. In this case both the main polymerization and the minor copolymerization are vinyl-type and the less energetic initiators, such as azodiisobutyronitrile, may be used. However, where such unsaturated groups are absent from the precursor and the stabilizing copolymer is formed by side reaction grafting of monomer onto the precursor, more powerful initiators, such as peroxides, may be required.

When the stabilizing block or graft copolymer is produced in situ from a soluble precursor, the polymeric constituent grafted onto the precursor is produced from the same monomer or mixture of monomers as the main disperse polymer and so is inherently of the same general nature as the main disperse polymer; at the same time, because it is of the same general nature as the insoluble disperse polymer it is of different polarity to the solvated polymeric constituent of the copolymer. As a result, this polymeric constituent of the stabilizing copolymer readily becomes associated with the similar polymer in the disperse particles as they are formed and in this way the stabilizing solvated polymeric constituent of the copolymer becomes attached to the disperse particles. In general, where the main disperse polymer is polar, the second polymeric constituent of the block or graft copolymer will also be polar and the solvated polymeric constituent will be non-polar.

We have found that acrylic polymers made by these dispersion polymerization processes have better solution characteristics than polymers made by solution processes, and that solutions of dispersion-polymerized polymer have much better application properties when used in coating compositions. The possibility of using mild solvents such as toluene is an advantage in formulating re-finish coating compositions since the milder solvents reduce the risk of the re-finish causing crazing of the underlying old coating.

An alternative advantage is that polymers of higher molecular weight may be used in the same solvents without giving rise to application problems such as "cobwebbing."

A further advantage of this invention is that when solutions of copolymers are prepared, the copolymers are of more uniform composition than those prepared by solution polymerization.

When used in coating compositions, the solutions of polymers are plasticized and pigmented in the usual manner.

The invention is illustrated by the following examples in which parts are by weight unless otherwise stated:

EXAMPLE 1

A copolymer of 98 parts of methyl methacrylate and 2 parts of methacrylic acid was made by dispersion-polymerization in 70–90° C. boiling point petroleum ether using a graft copolymer of polymethyl methacrylate and polylauryl methacrylate as the stabilizer.

Initial charge

| | Parts |
|---|---|
| 30% solution of graft copolymer polymethyl methacrylate/polylauryl methacrylate in petroleum ether (B.P. 70–90° C.) | 3.4 |
| Petroleum ether (B.P. 70–90° C.) | 320.0 |
| 10% solution of p-octyl mercaptan in petroleum ether (B.P. 70–90° C.) | 5.0 |
| Azodiisobutyronitrile | 1.5 |
| Methyl methacrylate | 32.0 |
| Methacrylic acid | 0.6 |

The mixture was refluxed for 20 minutes, after which time it had turned white. A mixture of:

| | Parts |
|---|---|
| Methyl methacrylate | 239.0 |
| Methacrylic acid | 4.9 |
| Azodiisobutyronitrile | 0.5 |
| p-Octyl mercaptan solution (as above) | 8.8 |
| Graft copolymer solution (as above) | 23.0 | was then added to the returning reflux stream over a period of 1¼ hours.

A mixture of:

| | Parts |
|---|---|
| Methyl methacrylate | 239.0 |
| Methacrylic acid | 4.9 |
| Azodiisobutyronitrile | 0.75 |
| p-Octyl mercaptan solution (as above) | 8.8 | was then added to the returning reflux stream over a period of 1¼ hours and reflux was continued for a further ½ hour.

The reflux stream was then diverted so that petroleum ether was removed by distillation, toluene being added to the reaction product at twice the rate at which the petroleum ether was removed. When substantially all the petroleum ether had been removed there was left a 35% solution of methacrylate copolymer in toluene.

At 25% solids, the solution of copolymer in toluene had a viscosity of 1.2–1.5 centipoises at 25° C. The copolymer, when dissolved in a mixture of 95 parts by volume of ethylene dichloride and 5 parts by volume of ethyl alcohol at 0.5% solids at 25° C., had a reduced viscosity of 0.4 which is equivalent to a viscosity average molecular weight of 100,000–120,000.

The 35% solids solution of the polymer in toluene was plasticized with dicyclohexyl phthalate at 30 parts of plasticizer to 70 parts of polymer and adjusted to spraying viscosity with acetone. The resulting composition could be sprayed without cob-webbing difficulties and the coatings on primed and surfaced steel panels had high gloss as sprayed, good build, good scratch filling properties, and did not cause crazing when sprayed over a coating of acrylic lacquer. The weathering properties of the coatings were at least equal to those of coatings of polymers made in solution.

A corresponding polymer with a reduced viscosity at 0.5% solids at 25° C., in ethylene dichloride 95 parts/ethyl alcohol 5 parts of 0.35 molecular weight equivalent 80,000–90,000, was made in solution in toluene. In making a 35% solids solution, a mixture of toluene, acetone, β-ethoxy ethyl acetate and methyl cyclohexanone had to be used to achieve the same viscosity as the solution of the dispersion polymer. When plasticized and thinned to spraying viscosity as described above it was found that spraying aids had to be added to the solution to obtain satisfactory application properties. Even then the coatings had a poor gloss and required much polishing, had poor scratch filling properties and caused crazing when used as a re-finish lacquer over existing acrylic lacquer.

Further, in the attempt to make the corresponding copolymer in solution by using the same proportion of initiator/transfer agent as in the dispersion polymerization only 69.5% conversion was achieved in 5 hours by which time the polymerization had ceased. (The dispersion process gave 95%+ conversion in 3–4 hours.) Furthermore, the acid value of the polymer precipitated after 52.5% conversion was significantly higher than at 69.5% conversion showing that the distribution of the methacrylic acid was not even throughout the copolymer.

EXAMPLE 2

Methyl methacrylate homopolymer dispersions were made by the process described in Example 1. In this case, however, instead of preformed stabilizer, a stabilizer precursor was used, i.e. a soluble polymeric compound containing C=C groups which are copolymerized with part of the main monomer to form the stabilizing graft copolymer. The stabilizer precursor was a copolymer of lauryl methacrylate and glycidyl methacrylate (weight ratio 97:3 and molecular weight about 50,000) the glycidyl groups of which were reacted with methacrylic acid to introduce on average 1.5 C=C groups per polymer molecule.

The charges were as follows:

(A)

| | Parts |
|---|---|
| 30% solution of precursor in petroleum ether (boiling point 70–90° C.) | 1.7 |
| Petroleum ether (B.P. 70–90° C.) | 320.0 |
| 10% solution of p-octyl mercaptan in petroleum ether (B.P. 70–90° C.) | 1.7 |
| Azodiisobutyronitrile | 1.7 |
| Methyl methacrylate | 32.6 |

(B)

| | Parts |
|---|---|
| Methyl methacrylate | 237.2 |
| Azodiisobutyronitrile | 0.5 |
| p-Octyl mercaptan solution (as above) | 8.75 |
| Precursor solution (as above) | 11.7 |

(C)

| | Parts |
|---|---|
| Methyl methacrylate | 237.2 |
| Azodiisobutyronitrile | 0.5 |
| p-Octyl mercaptan solution (as above) | 8.75 |

Using the above proportion of mercaptan (0.38% of monomer), the viscosity average molecular weight of the disperse polymer was about 70,000. On repeating the preparation using proportions of mercaptan corresponding to 0.76, 0.28, 0.19 and 0.095% of monomer, the molecular weight of the resulting polymers were about 45,000, 87,000, 101,000 and 170,000 respectively. (Viscosity average molecular weights were obtained from the reduced viscosity in toluene at 25° C. using formula of Chinai et al., J. Poly. Science, 17, 391.)

The dispersions were dried by evaporation of the petroleum ether and the polymer powder was dissolved in toluene 70 parts/acetone 30 parts to form a solution containing 40% of polymer. Dicyclohexyl phthalate was added in a proportion of 30 parts per 70 parts polymer and rutile titanium dioxide was dispersed in the polymer solution in a proportion of 0.5:1.0 by weight of pigment to polymer plus plasticizer.

When thinned to spraying viscosity with acetone all the compositions sprayed satisfactorily except that containing polymer of molecular weight 170,000 which showed signs of incipient "cob-webbing." Even at higher average molecular weights the compositions had a higher solids at a given viscosity and sprayed wetter and gave higher build (film thickness) than compositions based on polymers of average molecular weight about 70,000–80,000 (determined by method 445/61 of American Society for Testing Materials) made by solution polymerization. The gloss of the coatings as sprayed was also better.

EXAMPLE 3

A series of dispersions of copolymers of composition methyl methacrylate 90 parts/β-ethoxy ethyl methacrylate 8 parts/methacrylic acid 2 parts, was made as described in Example 2. The average molecular weight of the disperse polymer was varied from about 45,000 to about 170,000 ($[\eta]=0.25$ to 0.58 at 25° C. in ethylene dichloride 95 parts by volume/ethanol 5 parts by volume) by varying the amount of p-octyl mercaptan chain transfer agent from 0.75% to 0.1% by weight of the mixed monomers. The polymers were directly transferred into toluene solution as described in Example 1 to give solutions containing 40% polymer, the solutions then being plasticized and pigmented as described in Example 2. All the compositions sprayed satisfactorily except the one based on polymer of molecular weight about 170,000 which showed incipient "cob-webbing" but gave a good film on the application of a second coat. Flow of the sprayed coatings was good and gloss of the dried coatings varied from 63–70%. The compositions did not cause crazing when applied over a dried coat of acrylic lacquer under conditions where lacquers based on the solution-prepared methyl methacrylate homo-polymer did cause severe crazing. The mechanical properties and adhesion of the sprayed coatings over alkyd:melamine formaldehyde coatings which had been rubbed-down with abrasive paper was good.

EXAMPLE 4

A dispersion of a copolymer of composition methyl methacrylate 90 parts/β-ethoxy ethyl methacrylate 8 parts/β,N:N-dimethyl aminoethyl methacrylate 2 parts was made and transferred into solution as described in Example 1. The polymer had a viscosity average molecular weight of about 60,000–70,000. As plasticizer was added a mixture of 70% dicyclohexyl phthalate and 30% butyl benzyl phthalate in a proportion of 30 parts per 70 parts of polymer. Rutile titanium dioxide was dispersed in the solution in a proportion of 0.5:1.0 by weight of pigment to polymer/plasticizer. When sprayed, the coatings had much improved adhesion over rubbed-down stoved enamels (alkyd/melamine formaldehyde or urea formaldehyde finishes) both after air-drying and force-drying at 127° C.

EXAMPLE 5

The dispersion polymerization of Example 1 was repeated using, in place of the graft copolymer stabilizer, 15.8 parts of a preformed stabilizer made by reacting poly-12-hydroxystearic acid (number average molecular weight about 1,500) with glycidyl methacrylate to give a terminal methacrylate group followed by copolymerization of this unsaturated material with methyl methacrylate 98 parts/methacrylic acid 2 parts at mass ratio of 1:1.

The hot dispersion was converted to solution by rapidly adding 704 parts of toluene heated to 95–100° C., to give a 43% solution on toluene, followed by distillation of petroleum ether and a small amount of toluene until the solution contained about 45% by weight of polymer. Then acetone, 128 parts, was added to give a 40% solution.

EXAMPLE 6

The dispersion polymerization was carried out using 32 parts of petroleum ether (B.P. 70–90° C.) heated to reflux to which was added via the returning cold distillate, one feed, containing 0.8 part of the stabilizer precursor, 100 parts methyl methacrylate, 0.5 part primary octyl mercaptan and 0.4 part azodiisobutyronitrile, over 2 hours, to produce a dispersion containing 68% polymer. The coarse (5–6 microns) uniform particle size latex was converted into solution by adding 123 parts toluene heated to 95–100° C., over the shortest time (2 minutes on laboratory scale—10 minutes on workscale). Petroleum ether was then distilled out with good agitation until the remaining solution contained 45% polymer. This was then diluted to 40% solids with acetone. The final solvent composition was approximately 7% petroleum ether, 70% toluene and 23% acetone.

What is claimed is:

1. A process for the manufacture of a solution in an organic liquid of a polymer of a member of the group consisting of amides of acrylic and methacrylic acid and esters of acrylic and methacrylic acid with alcohols containing 1 to 8 carbon atoms, said process comprising polymerizing a monomer selected from the group consisting of amides of acrylic acid and methacrylic acid and esters of acrylic acid and methacrylic acid with alcohols containing 1 to 8 carbon atoms in an organic liquid dispersion medium in which said monomer is soluble and said polymer is insoluble, in the presence of an amount of a stabilizer for the polymer particles produced by said process effective for the production of polymer particles having a particle size of at least 0.5 micron, said stabilizer having a constituent which is solvated by said organic liquid dispersion medium and another constituent of different polarity which associates with disperse particles of said polymer and thereby provides a sheath of solvated constituent around said particles, to form a dispersion of particles of said polymer, adding to said liquid dispersion medium a solvent for said polymer which has a boiling point higher than the organic liquid dispersion medium in which the monomer was polymerized, and evaporating said organic liquid dispersion medium until said polymer is dissolved.

2. A process as set forth in claim 1 in which the amount of said stabilizer present during polymerization is 0.1 to 1% by weight of said dispersed polymer.

3. A process as set forth in claim 1 in which, during the polymerization, stabilizer is added concurrently with said monomer, the addition of stabilizer being discontinued after 40 to 70% of the monomer has been added.

4. A proces as set forth in claim 3 in which not less than 80% of the monomer is added to the organic liquid during the polymerization.

5. A process as set forth in claim 4 in which the rate of addition of monomer is such that the proportion of free monomer in the reaction liquid is not more than 50% by weight.

6. A process as set forth in claim 1 in which the organic liquid present during polymerization contains a solvent for said polymer, the proportion of solvent being such that said polymer is at least 95% insoluble in said organic liquid.

7. A process as set forth in claim 6 in which the amount of the solvent in said organic liquid present during polymerization is less than 40% by weight of said organic liquid.

8. A proces as set forth in claim 1 in which said organic liquid is evaporated by heating the dispersion to its refluxing temperature, heating the solvent for said polymer to at least as high a temperature, adding the heated solvent to the organic liquid and distilling the organic liquid.

References Cited

UNITED STATES PATENTS

| | | | |
|---|---|---|---|
| 3,095,388 | 6/1963 | Osmond et al. | 260—34.2 |
| 3,218,287 | 11/1965 | Schmidle et al. | 260—24.2 |
| 3,317,635 | 5/1967 | Osmond | 260—34.2 |

FOREIGN PATENTS

| | | | |
|---|---|---|---|
| 606,479 | 1/1962 | Belgium | 260—34.2 |

ALLAN LIEBERMAN, Primary Examiner

U.S. Cl. X.R.

260—29.1 R

UNITED STATES PATENT OFFICE
CERTIFICATE OF CORRECTION

Patent No. 3,808,169         Dated April 30, 1974

Inventor(s) Desmond Wilfrid John OSMOND et al

It is certified that error appears in the above-identified patent and that said Letters Patent are hereby corrected as shown below:

In the heading, insert the following information:

Assignee:   Imperial Chemical Industries Limited,
            London, England

Signed and sealed this 17th day of September 1974.

(SEAL)
Attest:

McCOY M. GIBSON JR.                C. MARSHALL DANN
Attesting Officer                  Commissioner of Patents